(No Model.)  R. DALTON.  2 Sheets—Sheet 1.
DITCHING MACHINE.
No. 304,620.  Patented Sept. 2, 1884.
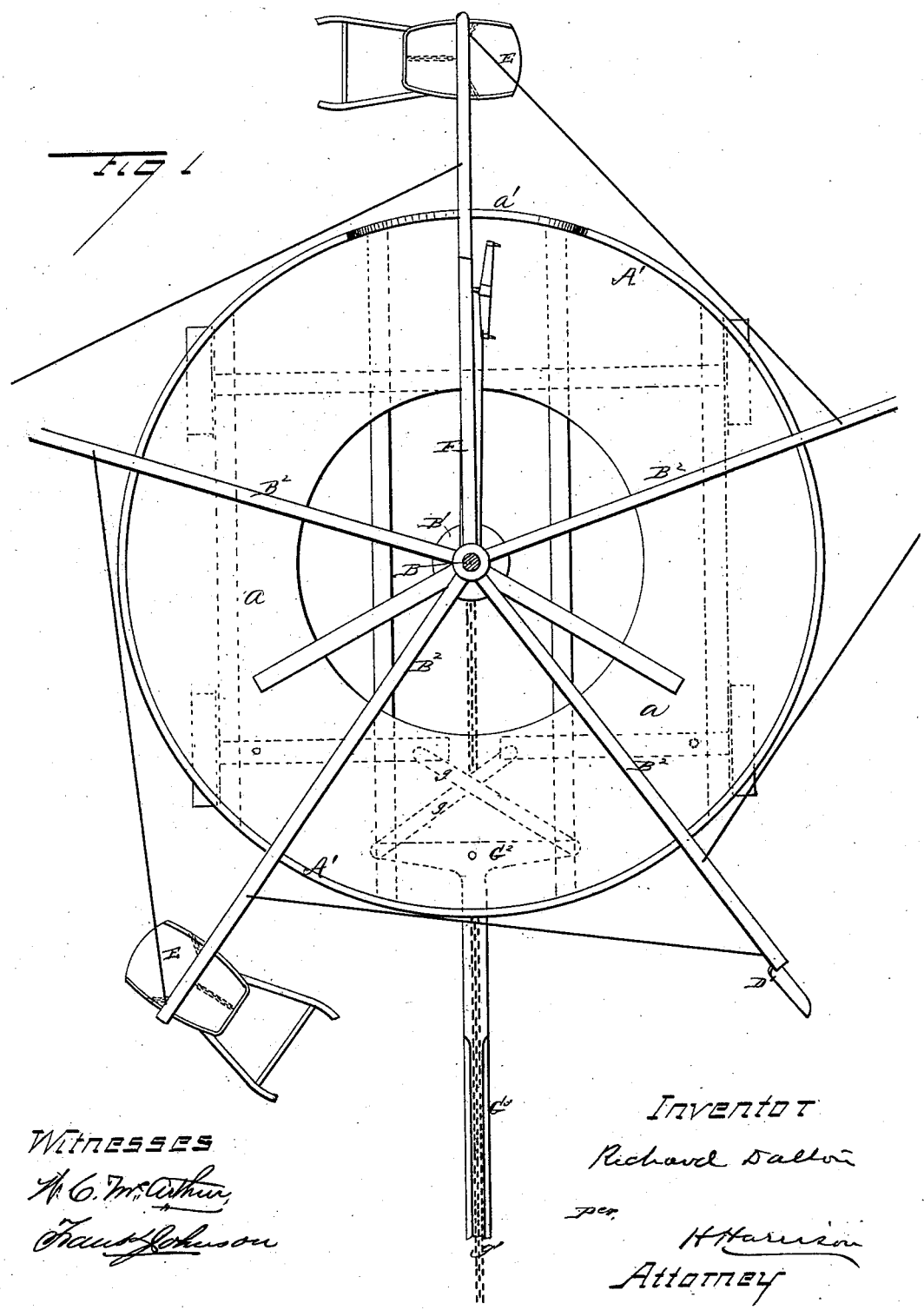

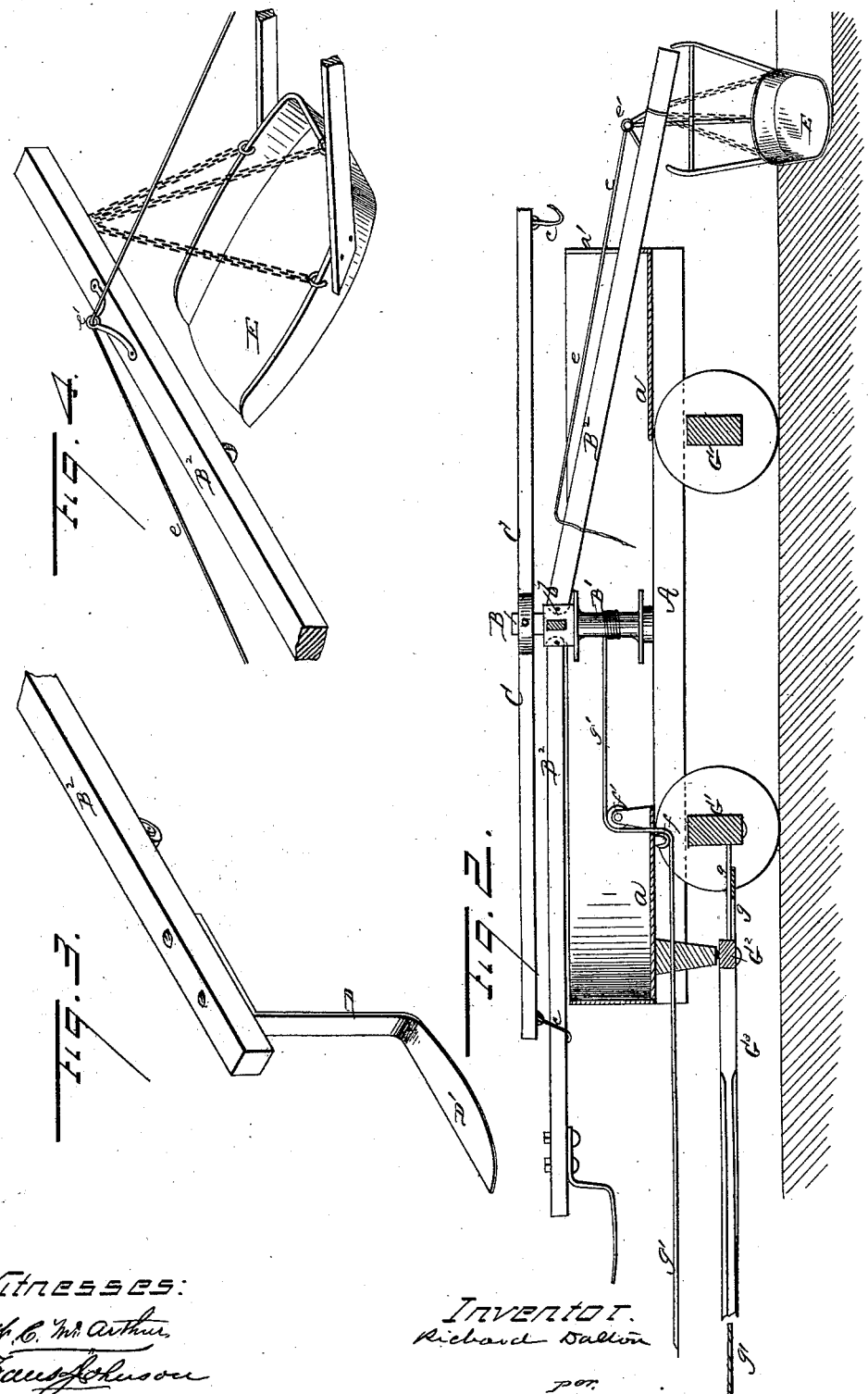

UNITED STATES PATENT OFFICE.

RICHARD DALTON, OF WILMETTE, ILLINOIS.

DITCHING-MACHINE.

SPECIFICATION forming part of Letters Patent No. 304,620, dated September 2, 1884.

Application filed August 3, 1883. (No model.)

*To all whom it may concern:*

Be it known that I, RICHARD DALTON, a citizen of the United States, residing at Wilmette, in the county of Cook and State of Illinois, have invented certain new and useful Improvements in Ditching-Machines, of which the following is a specification, to wit:

This invention relates to an improvement in ditching-machines; and it consists in a circular platform or frame mounted upon wheels or rollers, and provided with a series of horizontally-revolving scoops or cutters adapted to be dropped into and raised from the ground at a stated point, and a windlass and chain or rope adapted to draw the device forward, substantially as will be hereinafter more fully set forth.

In order to enable others skilled in the art to which my invention appertains to make and use the same, I will now proceed to describe its construction and operation, referring to the accompanying drawings, in which—

Figure 1 is a plan view; Fig. 2, a longitudinal vertical section; Fig. 3, a perspective detail view of one of the cutters or plows, and Fig. 4 a similar view of one of the scoops or shovels.

A represents the main frame, upon which is laid a circular floor or walk, $a$, of suitable width, surrounded by a railing, A', as shown in Figs. 1 and 2. This railing A' is cut away at $a'$ upon the rear side, for a purpose presently explained, nearly to the floor $a$.

In the center of the frame A is mounted a post, B, upon the lower end of which is secured a capstan or windlass, B', and above this is a loose band, $b$, in which is pivoted or hinged a series of arms or sweeps, $B^2$, the outer ends of which rest upon the railing, as shown; and secured to the post B above the loose collar or band $b$ is a pair of arms, C, carrying hooks $c$ upon their outer ends, by which they are readily attached to one of the sweeps or arms to connect them with the capstan and cause them to revolve together. One of the sweeps $B^2$ is provided upon its outer end with a cutter or plow, consisting of a bar of metal, D, projecting downward a suitable distance, and then turned outward at right angles, forming a cutting-blade, D', as shown by Fig. 3. Each of the other sweeps is provided with a scoop or large shovel, E, suspended by three chains or similar devices, and provided with handles by which they may be guided, as in the ordinary road-scrapers. Each scoop is provided with a tripping-line, $e$, secured to the handles or the rear side of the pan, and, passing through an eye, $e'$, upon the sweep or arm, is led in toward the capstan to within convenient reach of the operator there. The loose band $b$ is also provided with a series of bars or arms, F, extending outward a suitable distance over each sweep-arm, and to the ends of which horses are attached to operate the machine. While I have only shown one of these arm F in Fig. 1, I intend to use as many as may be required to obtain the power necessary. The frame A is supported by two axles, G G', each carrying a suitable number of wheels or rollers, and the forward one being divided into two parts, each of which is pivoted to the main frame at its outer end, and its inner end is allowed a limited horizontal movement. The inner ends of these axles are connected by links $g$ $g$, which cross each other, to the opposite ends of the cross-bar $G^2$ of the tongue $G^3$, which is pivoted beneath the frame, as shown by dotted lines in Fig. 1. This tongue has its outer end provided with a rope or chain, $g'$, which is carried forward a suitable distance and rove through a pulley secured to a post driven into the ground. It is then carried back and over guide-pulleys $f f'$ on the frame and secured to the capstan B', for hauling the apparatus forward.

In operation, as many horses are attached to the arms F as may be required, either single or double, according to the width of the platform upon which they travel. When they start, the sweeps are revolved, the cutter or plow falls at the point where the supporting-rail is cut away, and cuts the ground transversely both vertically and horizontally, and this is followed by the scoops, which are each seized by their handles as they descend by a man upon the ground and guided to scoop up or lift the earth loosened by the cutter, and as the pass on are raised, and when arriving at a suitable point in their course the operator in the center of the device pulls the tripping-line and dumps them either into a wagon or upon the ground beside the machine, as may be desired. When the ditch is of the proper depth, the operator connects the arms C with one of the sweeps, which starts the capstan, and, winding in the rope or chain, drags the machine forward till again released, the ditching being all the while in progress. Either broad-faced wheels or rollers may be used to support the machine, as may be required by the nature of the ground to be traversed, and as many scoops and cutters may be employed as the size of the device will admit.

To facilitate transportation from place to place, the sides of the main frame are made hinged or removable beyond the ends of the axle, and may be removed or folded up to take up less room.

It is evident that this device may be applied to other uses than ditching, as clearing snow and other farm uses; and steam-power may be used in place of horses, if so desired.

It is evident that when rollers are used instead of wheels to support the machine I am enabled to use it upon ground too soft to admit of horses walking in the ordinary way, and when the sweeps are removed the device is applicable as a power to move heavy loads, either upon or pulled by the machine.

I am aware that it is not new to operate a ditcher or excavator by means of horses attached to a sweep-arm and traveling upon a circular platform carried by the machine itself, and I do not desire to be understood as claiming such, broadly, as my invention.

Having thus fully described my invention, what I claim as new, and desire to secure by Letters Patent, is—

1. In a ditching-machine, a circular platform mounted upon suitable wheels or rollers, and having a supporting-rail cut away upon one side, in combination with a central post formed or provided with a windlass or capstan, a series of sweeps or arms carrying scoops and cutters, and hinged to a ring or band loose upon the central post, a series of arms for attaching horses, a device for engaging and disengaging the sweeps and capstan, and a hauling rope or chain adapted to drag the machine forward by being wound upon the capstan, substantially as and for the purpose set forth.

2. In a ditching-machine, a series of revolving arms, B², hinged to have a suitable vertical movement at suitable points in their course, in combination with a series of scoops, E, connected by chains with the sweeps, and provided with handles, and the tripping-lines $e\ e$, led through guides on the sweeps, and extending in to within easy reach of the operator, substantially as and for the purpose set forth.

3. A ditching-machine consisting of the frame A, platform $a$, and railing A', cut away upon one side, the central post, B, capstan B', loose band $b$, having a series of hinged arms, B², carrying the scoops E and cutters D, arms C, with hooks $c$, attaching-arms F, axles G G', the latter made in two parts and hinged as described, tongue G³, links $g\ g$, chain $g'$, and guide-pulleys $f\ f'$, all combined, constructed, and arranged to operate substantially as and for the purpose set forth.

In testimony whereof I affix my signature in presence of two witnesses.

RICHARD DALTON.

Witnesses:
CHAS. KRESSMANN,
FRANK JOHNSON.